May 13, 1924.

A. V. BONNER

CHURN

Filed July 20, 1923  3 Sheets-Sheet 1

1,494,209

A. V. Bonner
INVENTOR

BY Victor J. Evans
ATTORNEY

WITNESS:

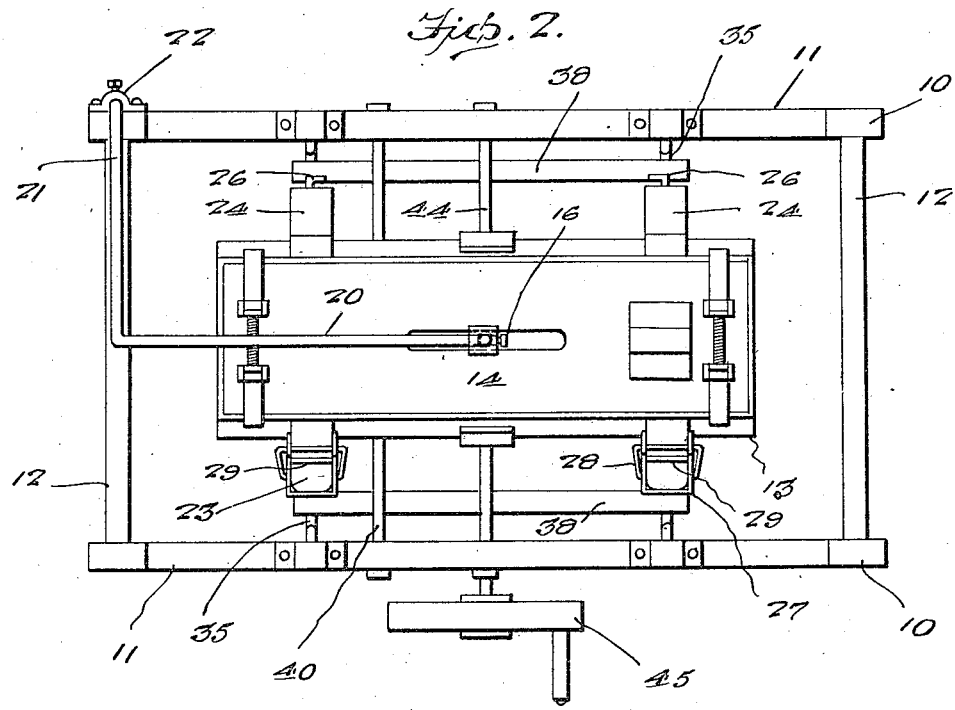
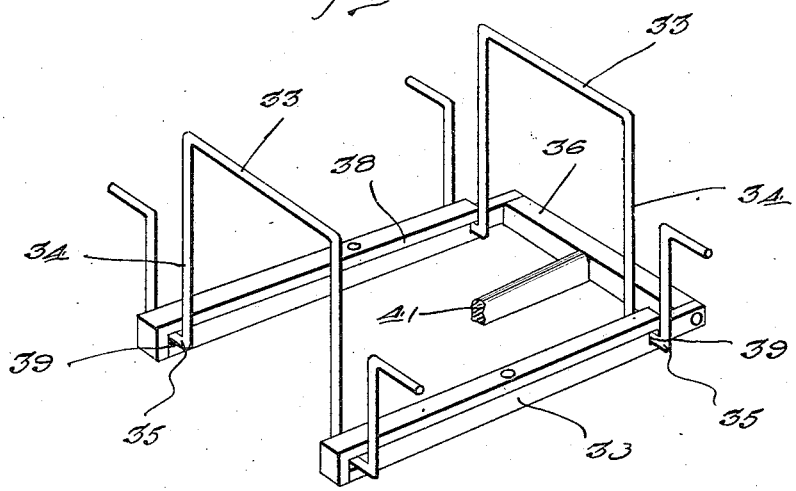

May 13, 1924.
A. V. BONNER
CHURN
Filed July 20, 1923      3 Sheets-Sheet 3
1,494,209
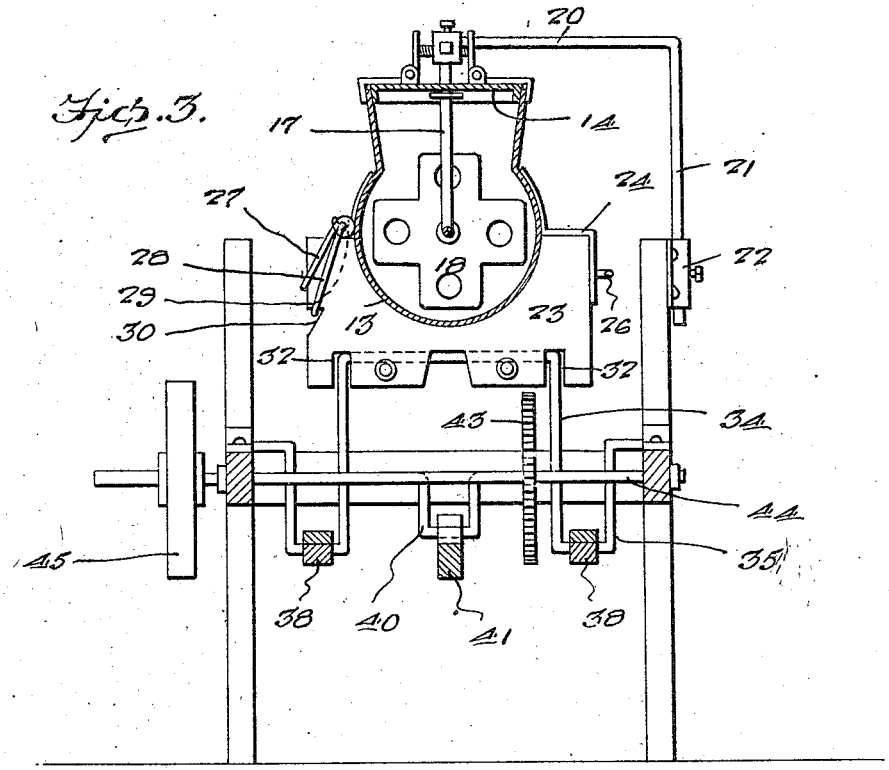
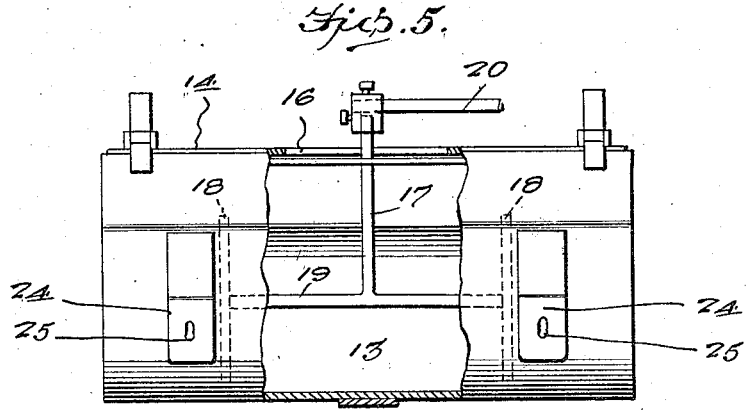
A. V. Bonner INVENTOR
BY Victor J. Evans ATTORNEY
WITNESS:

Patented May 13, 1924.

1,494,209

UNITED STATES PATENT OFFICE.

AUBREY VICTOR BONNER, OF ERICK, OKLAHOMA.

CHURN.

Application filed July 20, 1923. Serial No. 652,805.

*To all whom it may concern:*

Be it known that I, AUBREY V. BONNER, a citizen of the United States, residing at Erick, in the county of Beckham and State of Oklahoma, have invented new and useful Improvements in Churns, of which the following is a specification.

This invention relates to churns, and contemplates a structure wherein the churn body is mounted for oscillating movement with relation to a fixed dasher, and associated with means whereby the body can be operated with the expenditure of a minimun amount of effort to accomplish the desired result in quick order.

The nature and advantages of the invention will be better understood, when the following detailed description is read in connection with the accompanying drawings, the invention residing in the combination, construction and arrangement of parts as claimed.

In the drawings forming part of this application, like numerals of reference indicate similar parts in the several views, and wherein:

Figure 2 is a top plan view.

Figure 3 is a sectional view taken on the line 3—3 of Figure 2.

Figure 5 is a fragmentary view of the churn body removed and its supporting structure.

Figure 6 is a detail view of the supporting frame for the churn body.

Figure 1:
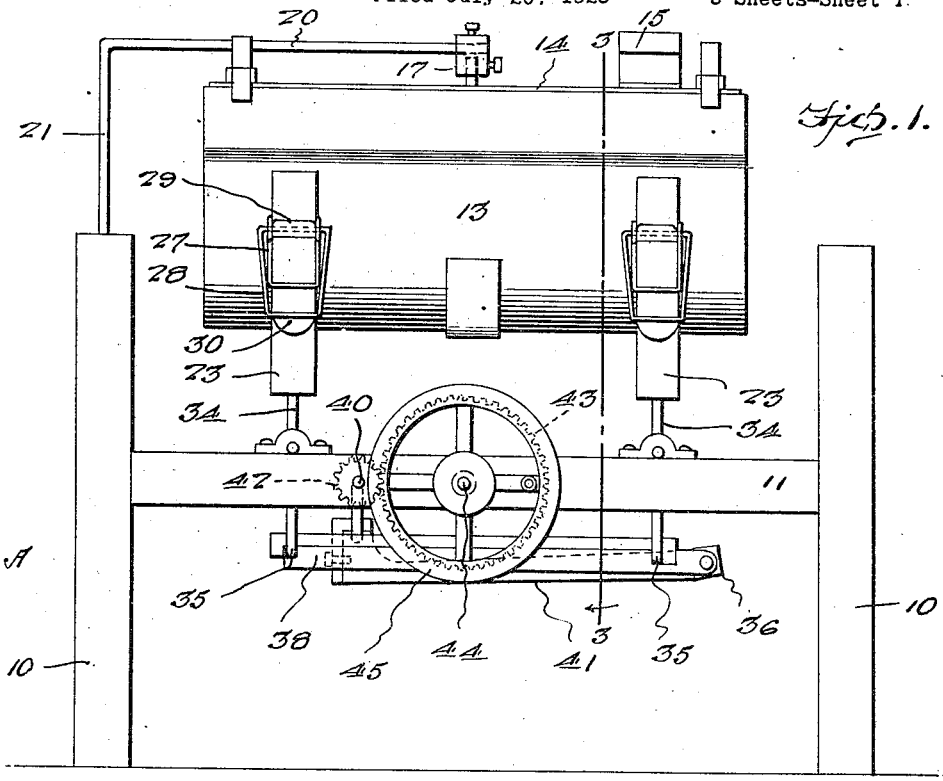
Figure 1 is a side elevation of the invention.
Figure 4:
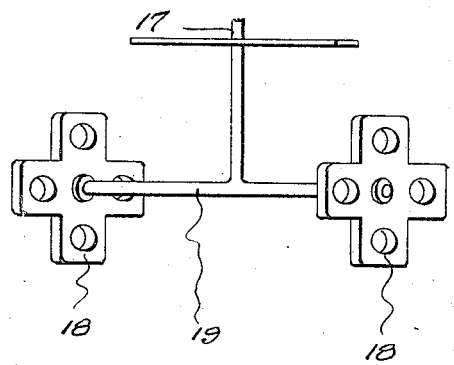
Figure 4 is a detail view of the dasher.
Figure 7:
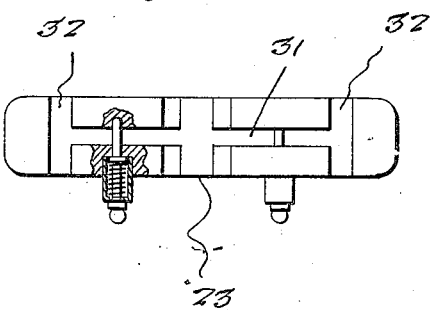
Figure 7 is a detail view partly in section of one of the yokes upon which the churn body reposes.

Referring to the drawings in detail, A indicates a supporting structure upon which the movable parts of the invention are mounted, this structure being composed of posts or uprights 10 which are connected together by spaced parallel side members 11 and end members 12. The churn body is mounted upon a supporting structure for oscillatory movement, this body being indicated at 13, and is preferably of the configuration shown, although said churn body may vary in size and shape without departing from the spirit of the invention. A cover for the body is indicated at 14, and is equipped with a suitable handle 15, and is further provided with a longitudinal slot 16 through which projects a vertical rod 17 forming part of a dasher construction clearly shown in Figure 4. This dasher comprises spaced end members 18 preferably shaped to resemble a cross, and the members are connected by a shaft 19. The rod 17 above referred to lies centrally from said shaft 19 and projects through the slot 16 of the cover of the body for a purpose to be presently described. It is to be noted that the end members 18 of the dasher are spaced an appreciable distance from the adjacent end walls of the churn body, the dasher remaining stationary while the churn body is oscillated. For the purpose of holding the dasher stationary, I employ an arm 20 which overlies the churn body, the arm having an offset extremity 21 secured to one of the posts 10. This arm is equipped with a clamp 22 which is attached to the rod 17, so that the churn body may be oscillated without imparting movement to the dasher, which is also permitted by reason of the slot in the cover thereof.

This body 13 is supported by companion yokes 23 which are shaped to correspond to the configuration of said body, yet the body is detachably connected with these yokes so that it can be conveniently removed therefrom when desired. For this purpose the body of the churn is provided with L-shaped extensions 24 which have an opening 25 to accommodate the headed elements 26 carried by the corresponding sides of the supporting yokes. When these elements are turned in one direction they occupy a position to hold the churn body supported upon the yokes at that particular side thereof, and by turning the headed elements in an opposite direction. the opening in the L-shaped extension may be passed over the heads of said elements to allow the churn body to be removed from the yokes. The opposed sides of the churn body are clamped to the adjacent sides of the yokes by means of removable clamps. preferably constructed from wire and including U-shaped portions 27 to the lower end of which is pivoted a loop 28. This particular side of the churn body is provided with hook like extensions 29 which receive the U-shaped portions of the clamps, which are suspended from said hooks, while the loops 29 are received by notches 30 formed in the adjacent sides of the churn body yokes, and when these loops are turned downwardly they operate to clamp the churn body upon the supporting yokes, holding these parts fixed relatively. The body or underside of each yoke is grooved as at 31 to receive the intermediate portion of the hangers, upon which these yokes are supported, the yokes being further provided with notches 32 which intersect the groove 31 so that the yokes may remain in true vertical parallel positions incident to the swinging motion of the hangers. Each hanger includes an inverted substantially U-shaped portion 33 upon which the said yokes are mounted, while the parallel limbs 34 of this portion are formed to provide crank portions 35, the latter being journalled for swinging movement in bearings on the opposite parallel side members of the supporting structure A. These crank portions of the respective hangers support a frame open at one end, or in other words, a frame made up of spaced parallel side members which are connected at one end by a transverse member 26. Each parallel side member of this frame is made up of superimposed sections 38 which are secured together in any suitable manner, but which sections are cut away as at 39 to receive the crank portions of the hangers. It is this frame that is oscillated between the manually actuated means to be presently described. By reason of the connection between this frame and the hangers for the churn body, oscillatory motion is of course imparted to the latter, while the dasher remains stationary for the purpose specified.

While the frame may be oscillated by any suitable means, I preferably make use of a crank shaft 40, the crank portion of which is associated with a pitman rod 41, which in turn is connected with the cross member of the frame. Also carried by the crank shaft is a small gear 42 which meshes with a much larger gear 43 carried by a shaft 44 journalled in the opposed side members of the supporting structure A, and which shaft is preferably rotated manually by means of a hand wheel 45, but motive power may be utilized if desired. Manifestly, the churn can be actuated with very little effort, and the result accomplished in reasonably quick order. Furthermore it will be noted that the churn body can be quickly and easily detached from its supporting yokes at any time, while the yokes together with their hangers can also be quickly separated from their supporting frame by simply disassociating the sections of the respective side members of this frame.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

In a churn, a base, a pair of crank shafts journaled thereon, yokes connected with the throws of the crank shaft, a horizontally arranged receptacle supported by the yokes, a substantially L-shaped element carried by the receptacle at one side thereof and engaging the yokes, and detachably associated therewith, and bails pivoted to the opposite side of the receptacle, and also detachably engaged with the yokes, and means for imparting oscillatory movement to the crank shaft.

In testimony whereof I affix my signature.

AUBREY VICTOR BONNER.